United States Patent [19]

Watanabe et al.

[11] Patent Number: 4,863,646

[45] Date of Patent: Sep. 5, 1989

[54] METHOD OF PRODUCING FINE PARTICLES OF THERMOPLASTIC RESIN

[75] Inventors: Tsutomu Watanabe, Yamada; Hideki Hayashi, Amagasaki, both of Japan

[73] Assignee: Shinto Paint Co., Ltd., Amagasaki, Japan

[21] Appl. No.: 109,797

[22] Filed: Oct. 14, 1987

[30] Foreign Application Priority Data

Oct. 23, 1986 [JP] Japan ................... 61-253073
Oct. 23, 1986 [JP] Japan ................... 61-253074
Oct. 23, 1986 [JP] Japan ................... 61-253075

[51] Int. Cl.$^4$ .............................................. B22D 11/01
[52] U.S. Cl. .............................................. 264/15; 264/9
[58] Field of Search .................................. 264/15, 9

[56] References Cited

U.S. PATENT DOCUMENTS 3,505,434  4/1970  Battaerd ................... 264/15
3,586,654  6/1971  Lerman et al. .......... 264/15
4,076,637  2/1978  Hurst ...................... 264/15
4,092,381  5/1978  Halpern et al. .......... 264/15

FOREIGN PATENT DOCUMENTS 233922  6/1960  Australia ................ 264/15
662957  5/1963  Canada .................... 264/15

Primary Examiner—Jan H. Silbaugh
Assistant Examiner—Mary Lynn Fertig
Attorney, Agent, or Firm—Armstrong, Nikaido, Marmelstein, Kubovcik & Murray

[57] ABSTRACT

A method for producing fine particles of a thermoplastic resin by mixing the thermoplastic resin with a medium which does not dissolve the resin, at a temperature not lower than the softening point or melting point of the resin to prepare a hot dispersion, cooling the dispersion to a temperature lower than the softening point or melting point of the resin and separating the solidified particles of thermoplastic resin from the medium. The medium is a silicone oil with a viscosity of 100 cst/25° C. or higher.

1 Claim, No Drawings

METHOD OF PRODUCING FINE PARTICLES OF THERMOPLASTIC RESIN

The present invention relates to a method for producing fine and substantially spherical particles of a thermoplastic resin.

The substantially spherical fine particles of the present invention are of great value industrially, for use in the field of paints, cosmetic bases, adsorbents, etc.

As methods for dividing thermoplastic resins into fine particles, there are known a method which comprises mechanically grinding a mass such as pellets or the like into powders, a method which comprises utilizing the difference in solubility depending on temperature using a suitable solvent, a method which comprises adding a poor solvent to a resin solution to form precipitates, etc. However, these methods involve disadvantages that particles are non-uniform in shape and are amorphous or homogeneous, and substantially spherical fine particles cannot be obtained. On the other hand, as a method for producing substantially spherical fine particles of polyamide resin, there is known a method wherein polyethylene glycol is used as a medium (for example, Japanese Patent Kokai No. 40134/85).

However, the method using polyethylene glycol as a medium has a drawback that the medium is solid at a normal temperature and therefore inconvenience is encountered in the separation of finely divided polyamide resin from the medium. The method further involves a drawback that there occurs deterioration during the production since thermostability of the medium is up to about 170° C.

As a result of extensive research work on the production of fine particles of a thermoplastic resin, the present inventors have found that, in a method for dispersing a thermoplastic resin in a medium with heating, uniform and substantially spherical fine particles of the resin can be obtained and the separation of the formed particles from the medium is easy, when there is used a silicone oil as the medium.

Thus the present invention is directed to a method for producing fine particles of a thermoplastic resin by mixing the thermoplastic resin with a medium which does not dissolve the resin, at a temperature not lower than the softening point or melting point of the resin to prepare a hot dispersion, cooling the dispersion down to a temperature lower than the softening point or melting point of the resin and then separating solidified particles of the thermoplastic resin from the medium, characterized in that the medium is a silicone oil.

Preferably the silicone oil to be used in the present invention is one selected from the group consisting of (1) dimethyl silicone oils represented by the general formula:

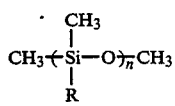
(I)

wherein R represents $C_{1-10}$ alkyl group or aralkyl group and n represents a number of 50–1000, (2) polyether modified silicone oils of the general formula:

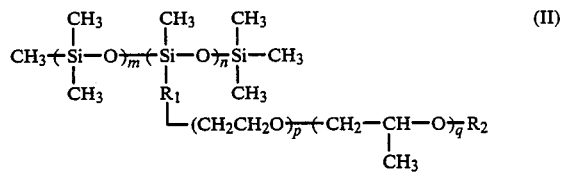

wherein m represents a number of 20–500, each of $R_1$ and $R_2$ represents an alkyl group having 1–10 carbon atoms, n is a number of 1–100, p is a number of 1–50 and q is a number of 0–50, and (3) alcohol modified silicone oils of the general formula:

or

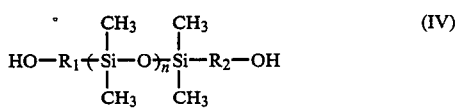

wherein n represents a number of 10–1000, and each of $R_1$ and $R_2$ represents an alkyl group having 1–10 carbon atoms.

In carrying out the method of the present invention the thermoplastic resin is thoroughly mixed with the medium at a temperature not lower than the softening point or melting point of the thermoplastic resin, generally in an inert gas atmosphere.

By doing this, there is formed a system in which fine droplets of the thermoplastic resin are dispersed in the medium.

Thereafter the whole of the dispersed system is cooled down to a temperature lower than the softening point, melting point or preferably glass transition, to solidify the fine droplets described above to form fine solid particles of the resin.

If desired, before cooling down, the suspension system is poured into a solvent which is capable of dissolving the medium but not capable of dissolving the resin. Examples of such solvents are benzene, xylene, mineral spirits, terpene, MIBK, MEK, toluene, ethanol, methanol, IPA, cellosolve, etc. A proper solvent may be selected depending upon the particular silicone oil and resin used.

Then the whole system is cooled as mentioned above to form fine solid particles of the resin.

Thereafter the formed fine particles of the thermoplastic resin are separated (for recovery) from the medium (and solvent, if used) by a suitable means such as filtration.

In this case, if desired, the separated fine particles may be washed with a solvent as described, whereby the medium can be completely removed from the fine particles.

The content of the thermoplastic resin in the dispersion system is not higher than 50% by weight, preferably not higher than 40% by weight. If the content of the thermoplastic resin exceeds 50% by weight, the thermoplastic resin cannot be fully uniformly dispersed in the medium and substantially spherical fine particles are formed only with difficulty, in some occasion.

The particle diameter and particle size distribution of the fine particles of thermoplastic resins to be obtained in accordance with the present invention are affected by factors such as a mixing ratio of the resin with the medium, a mixing force, temperature, etc. For example, when the ratio (content) of the thermoplastic resin is made small, the particle diameter becomes small. By properly choosing and combining these conditions for production, the particle diameter and particle size distribution can be controlled.

Examples of the silicone oil represented by the general formula (I) are SH-200, SH-230 (products of Toray Silicone K.K.), TSF 45, TSF 4420 (products of Toshiba Silicone K.K.), KF 96, KF 50 (products of Shin-Etsu Kagaku K.K.), etc.

Examples of the polyether-modified silicone oils of the formula (II) are TSF-4446, TSF-4452 (products of Toshiba Silicone K.K.), SF 8410, SH-3749 (products of Toray Silicone K.K.), etc.

Examples of the alcohol-modified silicone oils of the formula (III) or (IV) are XF-42-220, YF-3807 (products of Toshiba Silicone K.K.), SF-8427 (product of Toray Silicone K.K.), etc.

In any case those having a viscosity of 100 cst/25° C. or more are preferred, with more preference of those having 1000 cst/25° C. or more for the silicones of the formula (I) and those having 500 cst/25° C. or more for the silicones of the formula (II).

In case that the viscosity is less than 100 cst/25° C., the thermoplastic resin cannot be uniformly dispersed so that substantially spherical fine particles are formed only with difficulty.

As the thermoplastic resins that can be used in the present invention, any resin that does not dissolve in the medium described above may be used without particular restriction and, there can be used thermoplastic resins, for example, polyethylene, polypropylene, acryl resin, polyacetal, polyamide, polycarbonate, polyethylene terephthalate, polybutylene terephthalate, polyphenylene sulfide, fluorine resin, polyphenylene oxide, polymethylpentene, etc.

Hereafter the present invention will be described with reference to the examples.

EXAMPLE 1

In a nitrogen atmosphere, 60 g of nylon-12 and 240 g of dimethylsilicone oil SH-200 (trademark of the product of Toray Silicone K.K.) (viscosity, 10000 cst/25° C.) were heated to 210° C. After stirring for an hour, the mixture was cooled to 60° C. and filtered under pressure. The separated fine particles of nylon-12 were further washed with toluene. The fine particles of nylon-12 obtained were substantially spherical fine particles having a particle diameter of 5 to 50 μm.

EXAMPLE 2

In a nitrogen atmosphere, 60 g of polycarbonate resin and 240 g of dimethylsilicone oil SH-200 (trademark of the product of Toray Silicone K.K.) (viscosity, 5000 cst/25° C.) were heated to 260° C. After stirring for 30 minutes, the mixture was cooled to 50° C. and filtered under pressure. Then the fine particles on the filter were washed with n-hexane. The fine particles of polycarbonate obtained were substantially spherical fine particles having a particle diameter of 10 to 100 μm.

EXAMPLE 3

In a nitrogen atmosphere, 50 g of pellitized polybutylene terephthalate and 250 g of dimethylsilicone oil TSF 45 (trademark of the product of Toshiba Silicone K.K.) (viscosity, 5000 cst/25° C.) were heated to 260° C. After stirring for 30 minutes, the mixture was cooled to 60° C. and filtered under pressure. The fine particles on the filter were washed with toluene.

The fine particles obtained were substantially spherical fine particles having a particle diameter of 5 to 200 μm.

EXAMPLE 4

In a nitrogen atmosphere, 60 g of nylon-12 and 240 g of polyether-modified silicone oil (1000 cst/25° C.) TSF 4452 (trademark of the product of Toshiba Silicone K.K.) were heated to 230° C. After stirring for an hour, the mixture was cooled to 60° C. and filtered under pressure. The separated fine particles of nylon-12 were further washed with methanol.

The fine particles of nylon-12 obtained were substantially spherical fine particles having a particle diameter of 40 to 400 μm.

EXAMPLE 5

Procedures were carried out in a manner similar to Example 4 except for using 60 g of polystyrene instead of nylon-12. Thus substantially spherical fine particles of polystyrene having a particle diameter of 20 to 250 μm were obtained.

EXAMPLE 6

In a nitrogen atmosphere, 50 g of polyacetal and 250 g of polyether-modified dimethylsilicone oil (1500 cst/25° C.) TSF-4446 (trademark of the product of Toshiba Silicone K.K.) were heated to 240° C. After stirring for an hour, the mixture was cooled to 60° C. and filtered under pressure. The separated fine particles of polyacetal were further washed with methanol.

The fine particles of polyacetal obtained were substantially spherical fine particles having a particle diameter of 5 to 20 μm.

EXAMPLE 7

In a nitrogen atmosphere, 45 g of nylon-12 and 250 g of alcohol-modified dimethylsilicone oil (220 cst/25° C.) XF 42-220 (trademark of the product of Toshiba Silicone K.K.) were heated to 210° C. After stirring for an hour, the mixture was cooled to 60° C. and filtered under pressure. The separated fine particles of nylon-12 were further washed with toluene.

The fine particles of nylon-12 obtained were substantially spherical fine particles having a particle diameter of 5 to 200 μm.

EXAMPLE 8

In a nitrogen atmosphere, 60 g of polycarbonate and 240 g of alcohol-modified dimethylsilicone oil (10,000 cst/25° C.) YF-3807 (trademark of the product of Toshiba Silicone K.K.) were heated to 220° C. After stirring for an hour, the mixture was cooled to 60° C. and filtered under pressure. The fine particles on the filter were washed with n-hexane.

The fine particles of polycarbonate obtained were substantially spherical fine particles having a particle diameter of 5 to 100 μm.

EXAMPLE 9

Procedures were carried out in a manner similar to Example 8 except for using 60 g of polystyrene instead of polycarbonate. Thus substantially spherical fine particles of polystyrene having a particle diameter of 10 to 100 μm were obtained.

According to the method of the present invention, uniform and substantially spherical fine particles can be easily obtained and therefore, can be widely utilized in industrial fields of paints, cosmetics, adsorbents, etc.

What we claim is:

1. A method for producing fine particles of a nylon resin by mixing the nylon resin with a medium which does not dissolve the resin, at a temperature not lower than the softening point or melting point of said resin to prepare a hot dispersion, cooling the dispersion down to a temperature lower than the softening point or melting point of said resin to form particles of the resin, and then separating solidified particles of said resin from said medium, wherein said medium is a dimethyl silicone oil represented by the general formula:

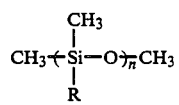

wherein R represents a $C_{1-10}$ alkyl group or an aralkyl group and n represents a number of 50–1000, and wherein the medium has a viscosity of 10,000 cst/25° C. or higher.

* * * * *